(12) United States Patent
Ma et al.

(10) Patent No.: US 11,999,287 B2
(45) Date of Patent: Jun. 4, 2024

(54) VEHICLE CONTROL METHOD AND APPARATUS, VEHICLE-MOUNTED DEVICE, VEHICLE, AND MEDIUM

(71) Applicant: NIO TECHNOLOGY (ANHUI) CO., LTD, Hefei (CN)

(72) Inventors: Yongliang Ma, Shanghai (CN); Mingzhi Tong, Shanghai (CN); Rui Zhang, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 84 days.

(21) Appl. No.: 17/743,618

(22) Filed: May 13, 2022

(65) Prior Publication Data

US 2022/0363187 A1 Nov. 17, 2022

(30) Foreign Application Priority Data

May 13, 2021 (CN) .......................... 202110524372.4

(51) Int. Cl.
*B60Q 1/50* (2006.01)
*B60Q 1/08* (2006.01)
*B60Q 1/52* (2006.01)

(52) U.S. Cl.
CPC ............. *B60Q 1/525* (2013.01); *B60Q 1/085* (2013.01); *B60Q 1/52* (2013.01);
(Continued)

(58) Field of Classification Search
None
See application file for complete search history.

(56) References Cited

U.S. PATENT DOCUMENTS

| 5,954,428 | A | * | 9/1999 | Eichhorn | F21S 41/675 |
| | | | | | 362/465 |
| 6,611,610 | B1 | * | 8/2003 | Stam | G06V 20/584 |
| | | | | | 382/104 |

(Continued)

*Primary Examiner* — Fekadeselassie Girma
(74) *Attorney, Agent, or Firm* — Sheridan Ross P.C.

(57) ABSTRACT

The invention relates to the field of vehicle technologies, and aims to solve a technical problem that when light control for avoidance of a vehicle is improper, traveling safety of the present vehicle, traveling safety of vehicles ahead for which light is controlled for avoidance, and/or safety, walking experience, etc. of the pedestrians for whom light is controlled for avoidance are/is affected to some degree. To solve the technical problem, embodiments of the invention provide a vehicle control method and apparatus, a control apparatus, a vehicle-mounted device, a vehicle, and a computer-readable storage medium. The control method includes: detecting target objects in front of a vehicle; determining whether the target objects are on a traveling path of the vehicle; and performing light control for avoidance for the target objects based on a determination result in a predetermined manner. With this setting, a strategy of light control for avoidance for a target object can be made by learning a traveling path of the target object, such that impact on traveling safety of the present vehicle, traveling safety of vehicles ahead for which light is controlled for avoidance, and/or safety, walking experience, etc. of the pedestrians for whom light is controlled for avoidance are/is kept as little as possible.

11 Claims, 2 Drawing Sheets

(52) U.S. Cl.
CPC .... *B60Q 2300/112* (2013.01); *B60Q 2300/13* (2013.01); *B60Q 2300/314* (2013.01)

(56) References Cited

U.S. PATENT DOCUMENTS

| | | | | |
|---|---|---|---|---|
| 7,156,542 | B2* | 1/2007 | Miller | B60Q 1/085 |
| | | | | 362/466 |
| 9,562,662 | B2* | 2/2017 | Lin | F21S 41/151 |
| 10,670,445 | B1* | 6/2020 | Heil | G01F 23/70 |
| 2007/0203682 | A1* | 8/2007 | Gummalla | G06F 3/1431 |
| | | | | 703/21 |
| 2008/0225271 | A1* | 9/2008 | Ohmura | B60Q 1/085 |
| | | | | 356/51 |
| 2013/0113935 | A1* | 5/2013 | Naik | B60Q 1/085 |
| | | | | 348/148 |
| 2016/0176333 | A1* | 6/2016 | Langkabel | B60Q 1/143 |
| | | | | 362/465 |
| 2016/0185276 | A1* | 6/2016 | Tanaka | F21S 41/657 |
| | | | | 362/466 |
| 2017/0120804 | A1* | 5/2017 | Kentley | G08G 1/167 |
| 2017/0203682 | A1* | 7/2017 | Atsmon | G01S 13/867 |
| 2017/0240098 | A1* | 8/2017 | Sweeney | B60Q 1/2665 |
| 2019/0061620 | A1* | 2/2019 | Inaba | G07C 5/008 |
| 2019/0255902 | A1* | 8/2019 | Toyoda | B60G 17/0416 |
| 2020/0156527 | A1* | 5/2020 | Stratz | F21S 41/657 |
| 2020/0247309 | A1* | 8/2020 | Herman | B60Q 11/00 |
| 2021/0001767 | A1* | 1/2021 | Yu | B60Q 1/08 |
| 2021/0331618 | A1* | 10/2021 | Obata | B60Q 1/143 |
| 2021/0403015 | A1* | 12/2021 | Kato | B60W 50/06 |
| 2022/0055526 | A1* | 2/2022 | Uvarov | G06N 5/04 |
| 2023/0371155 | A1* | 11/2023 | Baker | B60Q 1/085 |
| 2023/0391250 | A1* | 12/2023 | Hsu | B60Q 1/143 |

* cited by examiner

VEHICLE CONTROL METHOD AND APPARATUS, VEHICLE-MOUNTED DEVICE, VEHICLE, AND MEDIUM

CROSS-REFERENCE TO RELATED APPLICATIONS

This application claims the benefit of China Patent Application No. 202110524372.4 filed May 13, 2021, the entire contents of which are incorporated herein by reference in its entirety.

TECHNICAL FIELD

The invention relates to the field of vehicle technologies, and specifically, to a vehicle control method and apparatus, a control apparatus, a vehicle-mounted device, a vehicle, and a computer-readable storage medium.

BACKGROUND ART

On both sides of the head of a vehicle, headlights mainly for ensuring safety of the vehicle traveling at night are configured. Conventional headlights include high beam lights and low beam lights, but in recent years, there are technologies for replacing conventional headlights with matrix headlights. Compared with common headlights, matrix headlights can achieve better lighting effects in an area in front of the present vehicle, and therefore, are widely used.

Functions of conventional headlights can be implemented by lighting up different areas (for distribution illumination) of an LED matrix of matrix headlights. Lighting-up control is performed mainly based on traveling parameters of the vehicle: For example, at a high speed, light beams need to be relatively narrow while high, and at a low speed, light beams need to be relatively low while board. In a process of steering, based on a steering angle signal from a steering wheel, light for which an illumination area can be changed should be provided. On this basis, light illumination areas corresponding to different traveling parameters may be constructed through lighting-up control of corresponding areas of the LED matrix.

Based on the lighting-up control, according to an environment where the vehicle is located, light control for avoidance is usually further required. Specifically, when there are other vehicles, pedestrians, etc. in front of the vehicle, areas that are to be lit up of the LED matrix of the matrix headlights need to be properly adjusted. For example, extinguishing control are performed, to some degree, on lights that may irradiate some vehicles, pedestrians, etc., to avoid glare and other problems of (drivers and passengers inside) some vehicles, pedestrians, etc. ahead due to illumination of the present vehicle. However, when performing light control for avoidance for vehicles, pedestrians, etc., there are usually problems as follows: If the light control for avoidance is improper, traveling safety of the present vehicle, and traveling safety of vehicles for which light is controlled for avoidance, and/or safety, walking experience, etc. of the pedestrians for whom light is controlled for avoidance are/is affected to some degree.

Accordingly, there is a need for a new technical solution to solve the foregoing problems in the art.

SUMMARY OF THE INVENTION

In view of this, a first aspect of the invention provides a vehicle control method, including: detecting target objects in front of a vehicle; determining whether the target objects are on a traveling path of the vehicle; and performing light control for avoidance for the target objects based on a determination result in a predetermined manner.

With this setting, a strategy of light control for avoidance for a target object can be made by learning a traveling path of the target object.

Specifically, taking a traveling path of a vehicle (referred to as the present vehicle hereinafter) as a reference, a degree of impact of lights of the present vehicle on a target object is classified. On this basis, a strategy of light control for avoidance of the present vehicle is properly made based on a traveling path of the target object, such that while functions of headlights are implemented, impact on traveling safety of the present vehicle, traveling safety of target vehicles (referred to as vehicles ahead) for which light is controlled for avoidance, and safety, walking experience, etc. of the pedestrians for whom light is controlled for avoidance is kept as little as possible.

For example, for a two-wheeler, with a precondition that other factors of the two-wheeler itself are the same (for example, the two-wheeler moves at a constant speed and moves in a direction opposite to the present vehicle), when the two-wheeler travels on the traveling path of the present vehicle, an avoidance strategy is a strategy 1, and when the two-wheeler travels on a path adjacent to the traveling path of the present vehicle, the avoidance strategy may be adjusted to a strategy 2. Those skilled in the art may constitute a proper limitation on a manner of setting based on actual conditions, to optimize a difference between the strategy 1 and the strategy 2, such that traveling safety of the present vehicle itself and traveling safety of the two-wheeler are better guaranteed based on the difference.

As for a traveling path, it should be noted that: a traveling path in the invention is not necessarily a path that can be clearly divided such as a standard traffic lane. For example, when a vehicle travels on country roads without clear path division, those skilled in the art should define, flexibly based on actual conditions, an actual meaning of a traveling path on which a present vehicle is located. In addition, the target objects may include, but are not limited to, a coach, a truck, a two-wheeler, a stroller, a pedestrian, etc.

For the foregoing vehicle control method, in a possible implementation, the performing light control for avoidance for the target objects based on a determination result in a predetermined manner includes: when the target objects are on the traveling path of the vehicle, selectively performing light control for avoidance for target vehicles in the target objects that have overall dimensions not greater than a set dimension.

With this setting, a selective strategy of avoidance for a target vehicle as a target object on the traveling path of the present vehicle is provided.

Usually, the present vehicle uses a forward-looking camera to collect image data from an area in front of the present vehicle. Therefore, the overall dimensions herein are mainly dimensions from a point of view where a vehicle ahead in the area in front faces the present vehicle. For example, when a vehicle ahead travels in the front left of the present vehicle, overall dimensions corresponding to the vehicle ahead may include a vehicle length, a vehicle width, and a vehicle height, but when a vehicle ahead travels directly in front of the present vehicle, overall dimensions corresponding to the vehicle ahead mainly include a vehicle width and a vehicle height.

For example, overall dimensions include a vehicle length, a vehicle width, and a vehicle height, reference may be made to data on vehicle type classification. Vehicles with overall dimensions greater than specific dimensions are referred to as large vehicles such as coaches, heavy trucks, and a vehicle ahead with overall dimensions not greater than the specific dimensions are referred to as not-large vehicles that, for example, may further be divided into mid-size vehicles and small vehicles. For example, a large vehicle is a heavy truck is used, and the inventor has found through analysis that: It is assumed that a vehicle ahead moving in the same direction as the present vehicle includes a heavy truck (for example, the heavy truck is in the front left of the present vehicle), if the present vehicle performs light control for avoidance for the heavy truck, problems as follows may occur: When taillights of the heavy truck are not bright enough, although a forward-looking camera of the present vehicle recognizes the heavy truck, a driver of the present vehicle does not spot the heavy truck in time because the present vehicle has performed light control for avoidance for the heavy truck. Consequently, a strategy of light control for avoidance of the present vehicle may cause rear-end collision. Especially when a vehicle speed is high, a risk of having rear-end collision due to light control for avoidance increases significantly. For example, it may be the following case: in the invention, light control for avoidance is performed only for small vehicles, and no light control for avoidance is performed for mid-size vehicles and large vehicles. It should be noted that, in addition to small vehicles, light control for avoidance for a target object that has to be avoided (for example, pedestrians, two-wheelers, etc.) certainly still needs to be performed.

It should be noted that, when the target objects are on the traveling path of the present vehicle, a reason why the light control for avoidance does not involve determination of moving across the traveling path is as follows: When the present vehicle is in a traveling state, a field of view of pedestrians, vehicles ahead, etc. moving across the traveling path of the present vehicle is relatively slightly interfered by high beams of the present vehicle, and therefore, there are relatively low requirements on light control for avoiding high beams. In addition, for the pedestrians, vehicles ahead, etc. in a state of moving across the traveling path of the present vehicle, if the pedestrians, vehicles ahead, etc. are ignored by the present vehicle due to light control for avoidance of the present vehicle, an accident is easily caused. Therefore, light control for avoiding low beams of the present vehicle is not favorable for traveling safety. Therefore, mainly for the sake of safety, control for avoiding low beams for the pedestrians, vehicles ahead, etc. in a state of moving across the traveling path of the present vehicle is not proper.

For the foregoing vehicle control method, in a possible implementation, the selectively performing light control for avoidance for target vehicles in the target objects that have overall dimensions not greater than a set dimension includes: performing light control for avoidance for a target vehicle in the target vehicles that have overall dimensions not greater than the set dimension and having a change of distance from the vehicle not greater than a set value.

With this setting, a better strategy of light control for avoidance for small vehicles can be provided.

A reason for such a limitation on small vehicles for which light need to be controlled for avoidance is as follows: It is assumed that a change of distance between the present vehicle and a vehicle ahead is too fast, for the sake of traveling safety, a driver of the present vehicle needs to pay special attention to the vehicle ahead. Obviously, in this case, what is more important than light control for avoidance is to avoid rear-end collision caused by a relatively fast or too fast change of distance. Therefore, light control for avoidance should not be performed for such vehicles ahead.

It is assumed that the present vehicle is a vehicle behind, and then a too fast change of distance between the present vehicle and a vehicle ahead may be the following several cases:

(1) The present vehicle is at a high speed, and the vehicle ahead is at a low speed. This case corresponds to typical and severe rear-end collision existing on expressways: A vehicle ahead traveling at a very low speed (such as 40 km/h) is rear-ended by a vehicle behind traveling at a usual speed (such as 120 km/h). For the sake of safety, obviously, light control for avoidance should not be performed for the vehicle ahead in this case.

(2) The present vehicle is at a low speed, and the vehicle ahead is at a high speed. Contrary to the foregoing case, it is assumed that a vehicle ahead is a vehicle that travels at a high speed (for example, the speed of the vehicle ahead is 120 km/h and the speed of the present vehicle is 40 km/h) and travels in the same direction as the present vehicle. In this case, a result of a too fast change of distance between the present vehicle and the vehicle ahead is that the vehicle ahead moves away even faster, and therefore, it makes little sense to perform light control for avoidance for the vehicle ahead. It is assumed that the vehicle ahead travels at a high speed and travels in the same direction as the present vehicle, and for the sake of safety, light control for avoidance should not be performed for the vehicle ahead, either. Even if a speed of the vehicle ahead is relatively low, usually, light control for avoidance is not chosen to be performed for the vehicle ahead. Therefore, in most cases, light control for avoidance for small vehicles without a large change of distance is for small vehicles traveling in the same direction as the present vehicle.

For the foregoing vehicle control method, in a possible implementation, the performing light control for avoidance for the target objects based on a determination result in a predetermined manner includes: when the target objects are not on the traveling path of the vehicle, determining whether the target objects are in a state of moving across the traveling path of the vehicle; and determining, based on a determination result, whether to perform light control for avoidance for the target objects not on the traveling path of the vehicle.

With this setting, by involving a determination mechanism of moving across the traveling path, a strategy of avoidance for a target object not on the traveling path of the present vehicle is provided.

For the foregoing vehicle control method, in a possible implementation, the determining, based on a determination result, whether to perform light control for avoidance for the target objects not on the traveling path of the vehicle includes: skipping performing light control for avoidance for the target objects, when the target objects are in the state of moving across the traveling path of the vehicle.

With this setting, a strategy of distribution illumination of the vehicle can be further optimized.

Specifically, it can be learned by reference to a moving state of the target objects not on the traveling path of the present vehicle, two factors that are experience of this part of target objects and execution of a strategy of distribution illumination of the present vehicle are weakly correlated, and therefore, there is no need to change a current strategy of distribution illumination of the present vehicle to cater to experience of this part of target objects. In other words, by using a simplified strategy of avoidance, while there is no obvious or even no impact on experience of a target object, implementation of functions of headlights of the present vehicle may be better guaranteed. Light control for avoidance usually should be performed for the target object when the target objects are not in the state of moving across the traveling path of the vehicle.

For example, the target objects may include all pedestrians, two-wheelers, and all vehicles ahead, or may include only a part thereof, for example, only includes pedestrians and two-wheelers; and so on.

For the foregoing vehicle control method, in a possible implementation, in the step of performing light control for avoidance for the target objects based on a determination result in a predetermined manner, the performing light control for avoidance for the target object is specifically: performing light extinguishing control for the target objects based on a preset basic reference value corresponding to the target objects, to implement light control for avoidance for the target objects.

With this setting, the vehicle can perform light control for avoidance for the target objects based on the preset reference value.

It can be understood that the basic reference value mentioned in the invention should be understood in the following way: While a principle of using headlights and a principle of light control for avoidance are satisfied, a corresponding strategy of distribution illumination of matrix headlights is provided based on attributes of a current target object. For example, in a testing phase, for different types of target objects, a strategy of light control for avoidance corresponding to a target object and a typical operating point may be provided for the typical operating point having received special focus. The strategy of light control for avoidance is usually embodied as a group of values that can describe a lit-up/extinguished state of an LED matrix of matrix headlights. Such values may be referred to as reference values corresponding to a typical operating condition. Exemplarily, for a target object A, according to a common principle of using headlights, a strategy of distribution illumination of an LED matrix of matrix headlights is as follows: A local area 1 and a local area 2 are both in a lit-up state. When A is in a state s1, according to a principle of light control for avoidance, LED lights in the local area 1 need to be extinguished; or when A is in a state s2, according to a principle of light control for avoidance, all LED lights in the local area 1 and the local area 2 need to be extinguished. In this way, two set of references for extinguishing the local area 1 with (A, s1) and the local area (1, 2) with (A, s2) can be provided.

Obviously, the foregoing is merely exemplary description. Those skilled in the art usually take more diverse elements into consideration in actual conditions to determine an expected reference value. Those skilled in the art may determine a reference value (a basic reference value, a first reference value, and a second reference value) corresponding to a target object through experiments, testing, analysis, using a related model, etc. based on actual conditions, such that proper light control for avoidance is performed for the target object based on the reference value. For example, light control for avoidance may be performed for the target object by using a determined basic reference value directly, or the basic reference value may be processed first, and then light control for avoidance is performed for the target object based on a result after the processing (including but not limited to a first reference value and a second reference value below).

While a reference value is determined, in a phase of application, as long as a vehicle is exactly located at one of typical operating points, a control strategy can be executed based on a basic reference value corresponding to the typical operating point. For example, one or more LED lights in an LED matrix are extinguished, to implement light control for avoidance for the operating point. Exemplarily, when a target object is a pedestrian on the traveling path of the present vehicle, according to a strategy of distribution illumination determined based on a basic reference value, light control for avoidance should be performed for the pedestrian.

For the foregoing vehicle control method, in a possible implementation, performing light control for avoidance for the target objects based on a preset basic reference value corresponding to the target objects is specifically: performing light extinguishing control for the target objects based on a preset first reference value corresponding to the target objects, to implement light control for avoidance for the target object, where a manner of determining the first reference value is: determining a scenario mode of the vehicle based on a vehicle speed and a light illuminance of an environment where the vehicle is located; and determining the first reference value based on the scenario mode and the basic reference value.

With this setting, a strategy of light control for avoidance of matrix headlights can be optimized through involving of scenario modes.

The invention finds during analysis that even if light control for avoidance of matrix headlights performed based on the foregoing strategy of distribution illumination already can make it possible to perform good light control for avoidance on a target object in front of the present vehicle, there are such improvements that can be made as follows: Because an image obtained by a forward-looking camera from the front of a vehicle would significantly change in brightness, there may be an interference to an algorithm for recognizing a target object at night to some degree. Such an interference may in turn affect precision of controlling a strategy of distribution illumination of matrix headlights, and when the precision of controlling a strategy of distribution illumination is decreased, an accident may be caused. For example, a decrease in control precision may cause error extinguishing of lights corresponding to an illumination area. In the case of error extinguishing, there are obviously more risks of traveling safety.

Based on this, the invention can take into consideration a factor that is a scenario mode that can reflect to some degree conditions of a road on which a vehicle moves, to optimize a strategy of local lighting-up of matrix headlights. For example, the scenario mode may include, but is not limited to, an urban road condition scenario mode, a country road condition scenario mode, an expressway condition scenario mode, and a suburban road condition scenario mode. Based on different scenario modes, corresponding modifications may be made on the basic reference value. Those skilled in the art may determine a specific manner of modification based on actual conditions, for example, in conjunction with a related model, test data, empirical data, etc.

For the foregoing vehicle control method, in a possible implementation, the performing light extinguishing control for the target objects based on a preset basic reference value corresponding to the target objects, to implement light control for avoidance for the target objects is specifically: performing light control for avoidance for the target objects based on a preset second reference value corresponding to the target object, where a manner of determining the second reference value is: determining a slope mode of the vehicle based on an attitude of a body of the vehicle; and determining the second reference value based on the slope mode and the basic reference value.

With this setting, a strategy of light control for avoidance of matrix headlights can be optimized through involving of slope modes.

The invention finds during analysis that even if light control for avoidance of matrix headlights performed based on the foregoing strategy of distribution illumination already can make it possible to perform good light control for avoidance on a target object in front of the present vehicle, there are such improvements that can be made as follows: When a vehicle is in different attitudes, corresponding illumination areas are different. It is assumed that control of distribution illumination of matrix headlights is performed only based on a current vehicle speed and a steering angle light signal, and then such control cannot satisfy requirements on illumination of the vehicle in any attitude.

Based on this, the invention can take into consideration a factor that is a slope mode that can reflect a road on which a vehicle moves, to optimize a strategy of local lighting-up of matrix headlights. For example, the slope mode may include, but is not limited to, a long uphill slope mode and a long downhill slope mode. When the vehicle is in the long downhill slope mode or the long downhill slope mode, a strategy of distribution illumination is revised by adjusting a height of distribution illumination corresponding to a basic reference value. In other modes other than the long downhill slope mode and the long slope mode, a current strategy of distribution illumination corresponding to the basic reference value may be directly used.

For the foregoing vehicle control method, in a possible implementation, before the determining whether the target objects are on a traveling path of the vehicle, the control method further includes: determining whether the vehicle is in an operating condition of waiting at a crossroads; and only when the vehicle is not in the operating condition of waiting at the crossroads, determining whether the target object is on the traveling path of the vehicle.

For the foregoing vehicle control method, in a possible implementation, before the determining whether the target objects are on a traveling path of the vehicle, the control method further includes: determining whether the vehicle is in an operating condition of waiting at a crossroads; and performing light control for avoidance at least for children, strollers, and wheelchairs in a state of moving across the traveling path when the vehicle is in the operating condition of waiting at the crossroads.

With this setting, a targeted strategy of light control for avoidance is provided for the operating condition of waiting at the crossroads.

It can be understood that those skilled in the art may select a manner of determining whether the vehicle is in an operating condition of waiting at a crossroads flexibly based on actual conditions, for example, based on a vehicle speed and image data obtained by a forward-looking camera. Compared with common roadside parking, image data obtained by a forward-looking camera of a vehicle in an operating condition such as a crossroads includes an image related to the crossroads. In this case, a strategy of light control for avoidance of the vehicle in an operating condition such as a crossroads may be particularly made independently.

A second aspect of the invention provides a vehicle control apparatus, where the control apparatus includes a control module, and the control module is configured to perform the vehicle control method according to any one of the foregoing aspects.

It can be understood that the vehicle control apparatus has all technical effects of the vehicle control method according to any one of the foregoing aspects. Details are not provided herein again.

A third aspect of the invention provides a control apparatus, where the control apparatus includes a memory and a processor, and the memory is adapted to store a plurality of program codes, where the program codes are adapted to be loaded and run by the processor to perform the vehicle control method according to any one of the foregoing aspects.

It can be understood that the control apparatus has all technical effects of the vehicle control method according to any one of the foregoing aspects. Details are not provided herein again. For example, the control apparatus may be a control apparatus formed by various electronic devices.

A fourth aspect of the invention provides a vehicle-mounted device, where the vehicle-mounted device includes the foregoing (vehicle) control apparatus.

It can be understood that the vehicle-mounted device has all technical effects of the foregoing vehicle control method. Details are not provided herein again.

A fifth aspect of the invention provides a vehicle, where the vehicle includes the foregoing (vehicle) control apparatus or the foregoing vehicle-mounted device.

It can be understood that the vehicle has all technical effects of the foregoing vehicle control method. Details are not provided herein again.

A sixth aspect of the invention provides a computer-readable storage medium, where the computer-readable storage medium is adapted to store a plurality of program codes, and the program codes are adapted to be loaded and run by a processor to perform the vehicle control method according to any one of the foregoing aspects.

It can be understood that the computer-readable storage medium has all technical effects of the vehicle control method according to any one of the foregoing aspects. Details are not provided herein again.

In the description of the invention, the "control module" may include hardware, software, or a combination thereof. A module may include a hardware circuit, various suitable sensors, a communication port, and a memory, or may include a software part, such as program code, or may be a combination of software and hardware. The processor may be a central processing unit, a microprocessor, a graphics processing unit, a digital signal processor, or any other suitable processor. The processor has a data and/or signal processing function. The processor may be implemented in software, hardware, or a combination thereof. A non-transitory computer-readable storage medium includes any suitable medium that can store program code, such as a magnetic disk, a hard disk, an optical disc, a flash memory, a read-only memory, or a random access memory.

Further, it should be understood that, since the configuration of the control module is merely intended to describe functional units of a virtual system (apparatus) corresponding to the vehicle control method in the invention, a physical device corresponding to the control module may be a processor itself, or part of software, part of hardware, or part of a combination of software and hardware in the processor. Therefore, there being one control module is merely exemplary. It can be understood by those skilled in the art that the control module may be adaptively split based on actual conditions. A specific split form of the control module does not cause the technical solutions to depart from the principle of the invention. Therefore, all technical solutions after the split shall fall within the scope of protection of the invention.

Those skilled in the art can understand that in the invention, some or all of the procedures of the control method may be implemented by a computer program instructing relevant hardware. The computer program may be stored in a computer-readable storage medium. The computer program, when executed by a processor, may implement the steps of the foregoing method embodiments. The computer program includes a computer program code, and it can be understood that the program code includes, but is not limited to, a program code for performing the foregoing vehicle control method. For ease of description, only the parts related to the invention are shown. The computer program code may be in the form of source code, object code, executable file, or some intermediate forms. The computer-readable medium may include: any entity or device, medium, USB flash disk, removable hard disk, magnetic disk, optical disc, computer memory, read-only memory, random access memory, electrical carrier signal, telecommunications signal, software distribution medium, etc. that can carry the computer program code. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal and a telecommunications signal.

Solution 1. A vehicle control method, including: detecting target objects in front of a vehicle; determining whether the target objects are on a traveling path of the vehicle; and performing light control for avoidance for the target objects based on a determination result in a predetermined manner.

Solution 2. The control method according to solution 1, where the performing light control for avoidance for the target objects based on a determination result in a predetermined manner includes: when the target objects are on the traveling path of the vehicle, selectively performing light control for avoidance for target vehicles in the target objects that have overall dimensions less than or equal to a set dimension.

Solution 3. The control method according to solution 2, where the selectively performing light control for avoidance for target vehicles in the target objects that have overall dimensions less than or equal to a set dimension includes: performing light control for avoidance for a target vehicle in the target vehicles that have overall dimensions less than or equal to the set dimension and having a change of distance from the vehicle less than or equal to a set value.

Solution 4. The control method according to solution 1, where the performing light control for avoidance for the target objects based on a determination result in a predetermined manner includes: when the target objects are not on the traveling path of the vehicle, determining whether the target objects are in a state of moving across the traveling path of the vehicle; and determining, based on a determination result, whether to perform light control for avoidance for the target objects not on the traveling path of the vehicle.

Solution 5. The control method according to solution 4, where the determining, based on a determination result, whether to perform light control for avoidance for the target objects not on the traveling path of the vehicle includes: skipping performing light control for avoidance for the target objects, when the target objects are in the state of moving across the traveling path of the vehicle.

Solution 6. The control method according to any one of solutions 1 to 5, where in the step of performing light control for avoidance for the target objects based on a determination result in a predetermined manner, the performing light control for avoidance for the target object is specifically: performing light extinguishing control for the target objects based on a preset basic reference value corresponding to the target objects, to implement light control for avoidance for the target objects.

Solution 7. The control method according to solution 6, where the performing light extinguishing control for the target objects based on a preset basic reference value corresponding to the target objects, to implement light control for avoidance for the target objects is specifically: performing light control for avoidance for the target objects based on a preset first reference value corresponding to the target objects, where a manner of determining the first reference value is: determining a scenario mode of the vehicle based on a vehicle speed and a light illuminance of an environment where the vehicle is located; and determining the first reference value based on the scenario mode and the basic reference value.

Solution 8. The control method according to solution 6, where the performing light extinguishing control for the target objects based on a preset basic reference value corresponding to the target objects, to implement light control for avoidance for the target objects is specifically: performing light control for avoidance for the target objects based on a preset second reference value corresponding to the target object, where a manner of determining the second reference value is: determining a slope mode of the vehicle based on an attitude of a body of the vehicle; and determining the second reference value based on the slope mode and the basic reference value.

Solution 9. The control method according to solution 1, where before the determining whether the target objects are on a traveling path of the vehicle, the control method further includes: determining whether the vehicle is in an operating condition of waiting at a crossroads; and when the vehicle is not in the operating condition of waiting at the crossroads, determining whether the target object is on the traveling path of the vehicle.

Solution 10. The control method according to solution 1, where before the determining whether the target objects are on a traveling path of the vehicle, the control method further includes: determining whether the vehicle is in an operating condition of waiting at a crossroads; and performing light control for avoidance at least for children, strollers, and wheelchairs in a state of moving across the traveling path when the vehicle is in the operating condition of waiting at the crossroads.

Solution 11. A vehicle control apparatus, including a control module, where the control module is configured to perform the vehicle control method according to any one of solutions 1 to 10.

Solution 12. A control apparatus, including a memory and a processor, where the memory is adapted to store a plurality of program codes, and the program codes are adapted to be loaded and run by the processor to perform the vehicle control method according to any one of solutions 1 to 10.

Solution 13. A vehicle-mounted device, where the vehicle-mounted device includes the vehicle control apparatus according to solution 11; or the vehicle-mounted device includes the control apparatus according to solution 12.

Solution 14. A vehicle, where the vehicle includes the vehicle control apparatus according to solution 11; or the vehicle includes the control apparatus according to solution 12; or the vehicle includes the vehicle-mounted device according to solution 13.

Solution 15. A computer-readable storage medium, adapted to store a plurality of program codes, where the program codes are adapted to be loaded and run by a processor to perform the vehicle control method according to any one of solutions 1 to 10.

BRIEF DESCRIPTION OF THE DRAWINGS

The invention is described below with reference to the accompanying drawings. In the accompanying drawings.

LIST OF REFERENCE NUMERALS

100: Vehicle; 11: Matrix headlights; 12: Forward-looking camera; and 13: Headlight controller.

DETAILED DESCRIPTION OF EMBODIMENTS

Preferred embodiments of the invention are described below with reference to the accompanying drawings. It should be understood by those skilled in the art that these embodiments are only for explaining the technical principles of the invention and are not intended to limit the scope of protection of the invention. For example, types included in a scenario mode and a slope mode and manners of determining the various types are merely exemplary description. Those skilled in the art may have proper adjustments based on actual conditions; and so on.

It should be noted that in the description of the invention, the term "A and/or B" indicates all possible combinations of A and B, for example, only A, only B, or A and B. The term "at least one of A or B" or "at least one of A and B" has a meaning similar to "A and/or B" and may include only A, only B, or A and B. The terms "a/an" and "this" in the singular form may also include the plural form. The terms "first" and "second" are for descriptive purposes only and should not be construed as indicating or implying relative importance.

In addition, for better description of the invention, many details are provided in the following specific implementations, and those skilled in the art should understand that, without some specific details, the invention can still be implemented. In some instances, principles of cooking utensils, etc. well known to those skilled in the art are not described in detail in order to highlight the gist of the invention.

Figure 1:
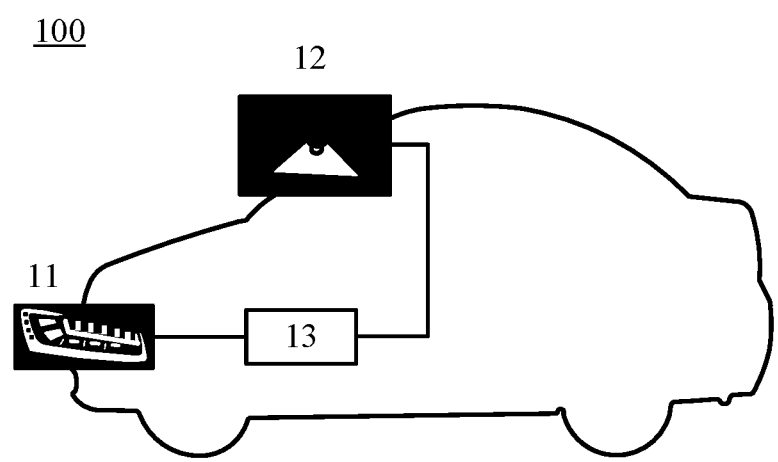
FIG. 1 is a schematic structural diagram of a vehicle according to an embodiment of the invention.

Referring to FIG. 1, FIG. 1 is a schematic structural diagram of a vehicle according to an embodiment of the invention. As shown in FIG. 1, matrix headlights 11 that can replace conventional headlights to implement functions of the conventional headlights are disposed on front sides of the vehicle 100 as the present vehicle. For example, one matrix headlight is disposed on each side of the head of the vehicle 100. A forward-looking camera 12 is disposed at a position near to the front side of the upper part in a vehicle cabin of the vehicle 100. The matrix headlights are equipped with a headlight controller 13, and the forward-looking camera 12 transmits image data collected from an area in front of the vehicle 100 to the headlight controller 13. During traveling, the headlight controller 13 controls lighting-up of an LED matrix in the matrix headlights 11 mainly based on traveling parameters of the vehicle 100 according to a principle of using headlights. In addition, on the basis of the foregoing principle of using headlights, the headlight controller 13 further uses a principle of light control for avoidance based on collected image data of a target object and with reference to a control method described below, thereby making a strategy of lighting-up control based on the principle of using headlights and the principle of light control for avoidance.

A procedure of lighting-up control on the LED matrix by the headlight controller may be, for example, as follows: Corresponding to each type of target objects, a group of preset basic reference values may be determined by making references. In a process of lighting-up control on the LED matrix by the headlight controller based on traveling parameters of the vehicle, a part (that should be lit up based on the traveling parameters but is also covered by a strategy of light control for avoidance) of the LED matrix is not lit up with reference to the basic reference value, such that proper light control for avoidance is performed for a corresponding target object.

As a preference, modification may be made to some degree to the basic reference value by involving a scenario mode of the vehicle, thereby optimizing the strategy of light control for avoidance. For example, in a possible implementation, the scenario mode includes four scenario modes that are an urban road condition scenario mode, a country road condition scenario mode, an expressway condition scenario mode, and a suburban road condition scenario mode that are determined based on a vehicle speed and a light illuminance of an environment where the vehicle is located (referred to as an ambient illuminance hereinafter). Details are as follows: When the ambient illuminance is greater than or equal to 30 lux, and a vehicle speed is less than 60 km/h, the scenario mode can be determined as the urban road condition scenario mode; when the ambient illuminance is less than 30 lux, and a vehicle speed is greater than or equal to 60 km/h and less than 90 km/h, the scenario mode can be determined as the country road condition scenario mode; when the ambient illuminance is less than 30 lux, and a vehicle speed is greater than or equal to 90 km/h, the scenario mode can be determined as the expressway condition scenario mode; or in other cases, the scenario mode is classified as the suburban road condition scenario mode. Obviously, the foregoing is merely an exemplary description of the scenario mode. Those skilled in the art may obtain other types of scenario modes through division based on actual conditions, for example, may add to, delete, or change the current scenario modes. In addition, in a process of obtaining scenario modes through division, in addition to the ambient illuminance and the vehicle speed, other parameters may further be used, for example, parameters related to smoothness of roads, etc.

For example, a road condition scenario mode of the vehicle may be determined based on a vehicle speed and an ambient illuminance in an environment in front of the vehicle that is detected by an independent ambient light sensor. Obviously, this is merely an exemplary description of determining the road condition scenario mode. Those skilled in the art may select other feasible manners based on actual conditions to determine a road condition mode of the vehicle. For example, it may be the following case: The ambient illuminance is determined by using an ambient light signal from a rain and light sensor; or is calculated based on an image obtained by the forward-looking camera; and so on.

On this basis, when the vehicle is in different scenario modes, the basic reference value is modified correspondingly, and the headlight controller controls lighting-up of matrix headlights based on a modified reference value (a first reference value). For example, it is assumed that the basic reference value is a reference value corresponding to the urban road condition scenario mode. In this case, when a current scenario mode of the vehicle is the country road condition scenario mode, an area for avoidance can be properly reduced when a target object is detected, for the following reason: When the vehicle is in the country road condition scenario mode, traveling safety of ensured by lighting is of a higher priority than comfort experience of pedestrians brought by light control for avoidance.

As a preference, modification may be made to some degree to the basic reference value by involving a current slope mode of the vehicle, thereby optimizing the strategy of light control for avoidance. For example, in a possible implementation, the slope mode includes a long uphill slope mode and a long downhill slope mode. Whether the vehicle is in the long uphill/downhill slope mode is determined based on an attitude of a body that is determined by an acceleration sensor and described by an included angle between a vehicle body and the ground: For example, when duration in which the attitude of the body is greater than ±3° is greater than set duration (such as 3 s), it may be determined that the vehicle has entered the uphill/downhill slope mode; or when duration in which the attitude of the body is restored to ±1° again is greater than set duration (such as 1 s), it may be determined that the vehicle has exited the uphill/downhill slope mode. Obviously, this is merely an exemplary description of determining the uphill/downhill slope mode. Those skilled in the art may select other feasible manners based on actual conditions to determine whether the vehicle is in the uphill/downhill slope mode. For example, it may be the following case: The determination is performed further based on a field of view on the road collected by the forward-looking camera, where in the long uphill slope mode, a visible level road becomes shorter suddenly, and in the long downhill slope mode, a change in a slope of a road can be recognized, and the like.

On this basis, when the vehicle is in the long uphill/downhill slope mode, the basic reference value is modified correspondingly, and the headlight controller controls lighting-up of matrix headlights based on a modified reference value (a second reference value). For example, when the vehicle is in the long uphill slope mode, the given second reference value should be a reference value indicating a height greater than that indicated by the basic reference value, which, for example, may be referred to as a long uphill reference value; or when the vehicle is in the long downhill slope mode, the given second reference value should be a reference value indicating a height less than that indicated by the basic reference value, which, for example, may be referred to as a long downhill reference value. In this way, while the principle of lighting-up and the principle of avoiding still comply with the basic reference value, the factor that is an attitude of a body is taken into consideration, such that a strategy of distribution illumination of matrix headlights can be optimized to some degree.

It can be understood that the slope mode including the long uphill slope mode and the long downhill slope mode is merely an exemplary description. Those skilled in the art may further divide the slope mode or divide the slope mode in other manners based on actual requirements. For example, it may be the following case: A long slope mode is further divided into a plurality of submodes, and a corresponding manner of modification is provided for each submode; and so on.

Figure 2:
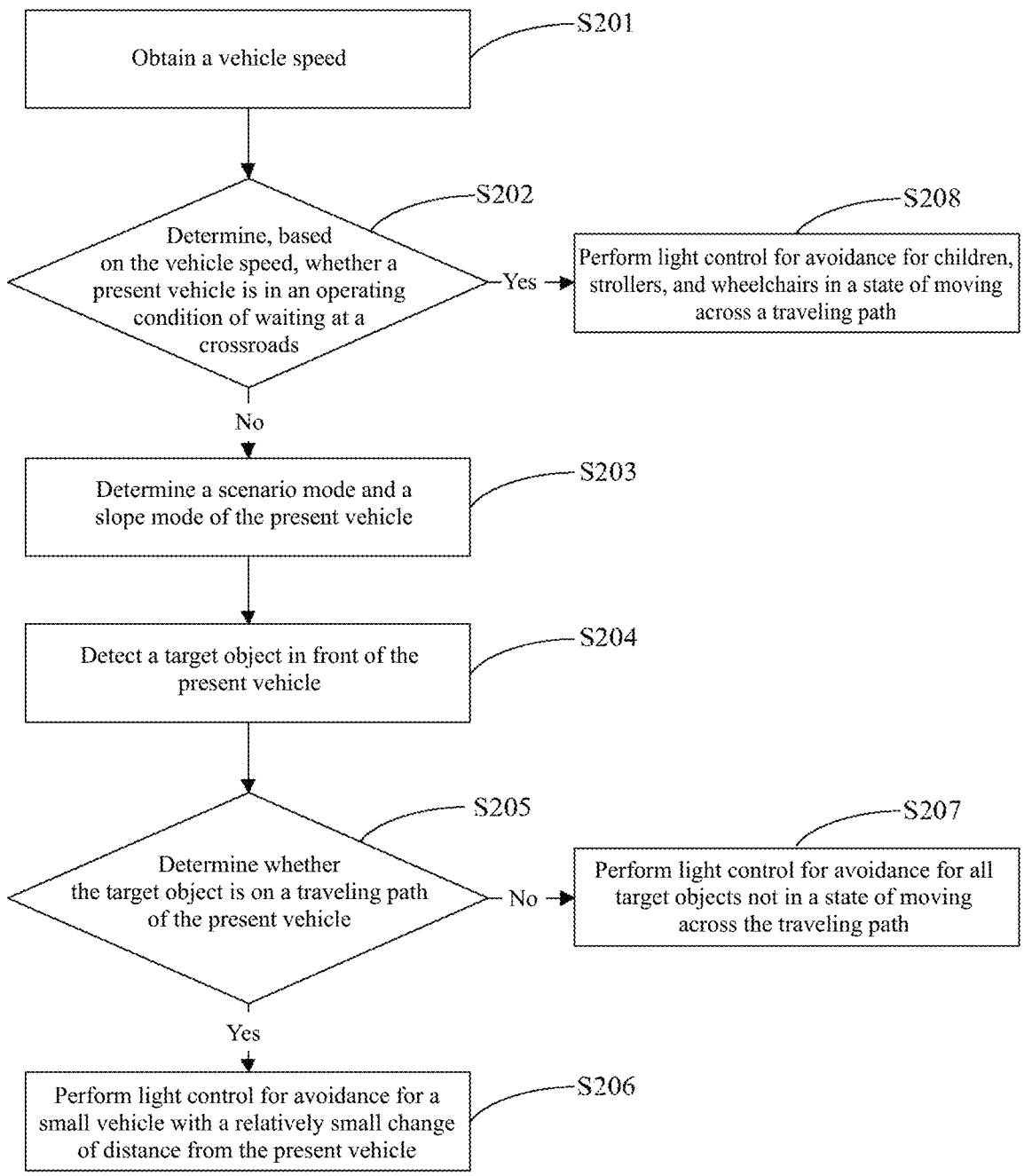
FIG. 2 is a schematic flowchart of a vehicle control method according to an embodiment of the invention.

In a specific implementation, the vehicle is equipped with a vehicle-mounted device, where the vehicle-mounted device includes a vehicle control apparatus, and the control apparatus includes a control module configured to perform a control method described below. Still referring to FIG. 2, FIG. 2 is a schematic flowchart of a vehicle control method according to an embodiment of the invention. As shown in FIG. 2, the control method mainly includes the following steps:

S201: a vehicle speed of a present vehicle is obtained.

S202: whether the present vehicle is currently in an operating condition of waiting at a crossroads is determined based on the vehicle speed.

If the present vehicle is currently in the operating condition of waiting at the crossroads, the method proceeds to step S208.

If the present vehicle is currently not in the operating condition of waiting at the crossroads, the method proceeds to step S203.

It can be understood that using the vehicle speed to determine whether the present vehicle is in the mode of waiting at the crossroads is an exemplary description. For example, to distinguish the operating condition of waiting at the crossroads from common roadside parking, image data collected by the forward-looking camera may further be used in a mechanism for determining whether the present vehicle is currently in the operating condition of waiting at the crossroads. For example, the image data definitely includes image data specific to the crossroads (for example, that of traffic lights, other vehicles in different directions, pedestrians, etc.).

When the present vehicle is not in the operating condition of waiting at the crossroads, control as follows is performed:

S203: a scenario mode of the present vehicle is determined (based on an ambient illuminance and the vehicle speed) and a slope mode of the present vehicle is determined (based on an attitude of a body of the vehicle), such that a headlight controller may invoke a reference value obtained through modification based on the basic reference value when controlling lighting-up of an LED matrix.

S204: a target object in front of the present vehicle is detected by using the forward-looking camera.

S205: whether the target objects are on a traveling path of the present vehicle is determined.

If the target objects are on the traveling path of the present vehicle, the method proceeds to step S206.

If the target objects are not on the traveling path of the present vehicle, the method proceeds to step S207.

For example, a laser radar may mainly be used to determine whether target objects such as a pedestrian, a vehicle ahead as a target vehicle, a two-wheeler, etc. in front of the present vehicle are on the traveling path of the present vehicle.

S206. Light control for avoidance is performed for target objects such as a pedestrian and a two-wheeler, etc., a small vehicle in the target objects that has a relatively small change of distance from the present vehicle is specifically selected from the vehicles ahead, and light control for avoidance is performed only for such a small vehicle.

S207. Only a target object not in a state of moving across the traveling path is selected. On this basis, simplified processing may be as follows: Light control for avoidance is performed for all target objects not in the state of moving across the traveling path.

Similar to determination of whether a target object is on the traveling path of the present vehicle, a change of a distance between a target object and the present vehicle and whether a target object is in a state of moving across the traveling path may also be determined mainly by using the foregoing laser radar.

S208. Light control for avoidance is performed at least for children, strollers, and wheelchairs in a state of moving across the traveling path when the present vehicle is in the operating condition of waiting at the crossroads.

A reason for independently making a specific strategy of light control for avoidance for the operating condition of waiting at the crossroads is as follows: Similar to common roadside parking, a vehicle in the operating condition of waiting at the crossroads usually uses low beams for lighting. However, the inventor has found an obvious phenomenon in practice: For a target object with a slow speed of moving/walking such as a child, a stroller, a wheelchair, etc., a probability of making reactions, for example, shielding his/her eyes, turning heads, etc. against low beam lighting is greatly increased. Especially for a child who is generally short, in a case of low beam lighting, glare can be easily experienced. Besides, for children who are still growing, glare may affect or even damage their eyesight to some degree. Therefore, the inventor uses the operating condition of waiting at the crossroads as a special case, to especially add light control for avoidance at least for children, strollers, and wheelchairs in a state of moving across the traveling path.

It should be noted that although the steps are described in a specific order in the foregoing embodiment, those skilled in the art can understand that in order to achieve the effects of the invention, different steps are not necessarily performed in this order, but may be performed simultaneously or in another order, or some steps may be added, replaced, or deleted, and these variations all fall within the scope of protection of the invention. For example, it may be the following case: When the scenario mode is the country road condition scenario mode or the suburban road condition scenario mode, determination of a slope mode is further involved. That is: a strategy of light control for avoidance of the present vehicle is implemented based on the basic reference value, the first reference value, and the second reference value. Alternatively, when the scenario mode is the expressway condition scenario mode or the urban road condition scenario mode, determination of a slope mode is not involved. That is: a strategy of light control for avoidance of the present vehicle is implemented based on the basic reference value or the first reference value.

It should be noted that, although an example in which the control method formed in the foregoing specific manner is used for description, those skilled in the art can understand that the invention is not limited to this. In fact, a user can flexibly adjust elements such as related steps and parameters in related steps based on actual application scenarios, etc.

Heretofore, the technical solutions of the invention have been described in conjunction with the preferred embodiments shown in the drawings, however, those skilled in the art can readily understand that the scope of protection of the invention is obviously not limited to these specific embodiments. Those skilled in the art could make equivalent changes or substitutions to the related technical features without departing from the principles of the invention, and all the technical solutions after the changes or the substitutions fall within the scope of protection of the invention.

The invention claimed is:

1. A vehicle control method, comprising:
   detecting target objects in front of a vehicle;
   determining whether the target objects are on a traveling path of the vehicle; and
   performing light control for avoidance for the target objects based on a determination result in a predetermined manner,
   wherein the performing light control for avoidance for the target objects based on a determination result in a predetermined manner comprises:
      when the target objects are on the traveling path of the vehicle, selectively performing light control for avoidance for target vehicles in the target objects that have overall dimensions less than or equal to a set dimension.

2. The control method according to claim 1, wherein the selectively performing light control for avoidance for target vehicles in the target objects that have overall dimensions less than or equal to a set dimension comprises:
   performing light control for avoidance for a target vehicle in the target vehicles that have overall dimensions less than or equal to the set dimension and having a change of distance from the vehicle less than or equal to a set value.

3. The control method according to claim 1, wherein the performing light control for avoidance for the target objects based on a determination result in a predetermined manner comprises:
   when the target objects are not on the traveling path of the vehicle, determining whether the target objects are in a state of moving across the traveling path of the vehicle; and
   determining, based on a determination result, whether to perform light control for avoidance for the target objects not on the traveling path of the vehicle.

4. The control method according to claim 3, wherein the determining, based on a determination result, whether to perform light control for avoidance for the target objects not on the traveling path of the vehicle comprises:
   skipping performing light control for avoidance for the target objects, when the target objects are in the state of moving across the traveling path of the vehicle.

5. The control method according to claim 1, wherein in the step of performing light control for avoidance for the target objects based on a determination result in a predetermined manner, the performing light control for avoidance for the target object is specifically:
   performing light extinguishing control for the target objects based on a preset basic reference value corresponding to the target objects, to implement light control for avoidance for the target objects.

6. The control method according to claim 5, wherein the performing light extinguishing control for the target objects based on a preset basic reference value corresponding to the target objects, to implement light control for avoidance for the target objects is specifically:
   performing light control for avoidance for the target objects based on a preset first reference value corresponding to the target objects,
   wherein a manner of determining the first reference value is:
   determining a scenario mode of the vehicle based on a vehicle speed and a light illuminance of an environment where the vehicle is located; and
   determining the first reference value based on the scenario mode and the basic reference value.

7. The control method according to claim 5, wherein the performing light extinguishing control for the target objects based on a preset basic reference value corresponding to the target objects, to implement light control for avoidance for the target objects is specifically:

performing light control for avoidance for the target objects based on a preset second reference value corresponding to the target objects, wherein a manner of determining the second reference value is:

determining a slope mode of the vehicle based on an attitude of a body of the vehicle; and determining the second reference value based on the slope mode and the basic reference value.

8. The control method according to claim 1, wherein before the determining whether the target objects are on a traveling path of the vehicle, the control method further comprises:

determining whether the vehicle is in an operating condition of waiting at a crossroads; and when the vehicle is not in the operating condition of waiting at the crossroads, determining whether the target object is on the traveling path of the vehicle.

9. The control method according to claim 1, wherein before the determining whether the target objects are on a traveling path of the vehicle, the control method further comprises:

determining whether the vehicle is in an operating condition of waiting at a crossroads; and performing light control for avoidance at least for children, strollers, and wheelchairs in a state of moving across the traveling path when the vehicle is in the operating condition of waiting at the crossroads.

10. A control apparatus, comprising a memory and a processor, wherein the memory is adapted to store a plurality of program codes, and the program codes are adapted to be loaded and run by the processor to perform the vehicle control method according to claim 1.

11. A vehicle, wherein the vehicle comprises the control apparatus according to claim 10.

\* \* \* \* \*